(12) United States Patent
Choi et al.

(10) Patent No.: US 12,590,927 B2
(45) Date of Patent: Mar. 31, 2026

(54) ELECTRONIC DEVICE AND CONTROL METHOD THEREFOR

(71) Applicant: Samsung Electronics Co., Ltd.,
Suwon-si (KR)

(72) Inventors: Hongseok Choi, Suwon-si (KR);
Sunghoon Kang, Seoul (KR);
Minkeun Kim, Suwon-si (KR); **Jiyeon
Kim, Yongin-si (KR); Jaeyoung Lee**,
Suwon-si (KR)

(73) Assignee: Samsung Electronics Co., Ltd.,
Suwon-si (KR)

( * ) Notice: Subject to any disclaimer, the term of this
patent is extended or adjusted under 35
U.S.C. 154(b) by 408 days.

(21) Appl. No.: 18/343,375

(22) Filed: Jun. 28, 2023

(65) Prior Publication Data

US 2023/0333059 A1      Oct. 19, 2023

Related U.S. Application Data

(63) Continuation of application No.
PCT/KR2021/019841, filed on Dec. 24, 2021.

(30) Foreign Application Priority Data

Dec. 30, 2020     (KR) ......................... 10-2020-0188365

(51) Int. Cl.
*G01N 29/04* (2006.01)
*G01D 21/02* (2006.01)
(Continued)

(52) U.S. Cl.
CPC ........... *G01N 29/041* (2013.01); *G01D 21/02*
(2013.01); *G01N 22/02* (2013.01); *G01N
21/8803* (2013.01); *G01N 2021/8887*
(2013.01)

(58) Field of Classification Search
None
See application file for complete search history.

(56) References Cited

U.S. PATENT DOCUMENTS

| | | |
|---|---|---|
| 11,423,302 B2 | 8/2022 | Kim et al. |
| 11,460,817 B2 | 10/2022 | Kim et al. |
| (Continued) | | |

FOREIGN PATENT DOCUMENTS

| | | |
|---|---|---|
| KR | 10-2019-0029676 A | 3/2019 |
| KR | 10-2019-0084915 A | 7/2019 |
| (Continued) | | |

OTHER PUBLICATIONS

International Search Report dated Apr. 18, 2022, issued in International Application No. PCT/KR2021/019841.
(Continued)

*Primary Examiner* — Suman K Nath
(74) *Attorney, Agent, or Firm* — Jefferson IP Law, LLP

(57) ABSTRACT

An electronic device is provided. The electronic device
includes an ultrasonic sensor, an electromagnetic wave
sensor, a memory for storing at least one instruction, and a
processor electronically connected to the memory, wherein
the processor is configured to control an ultrasonic sensor to
emit ultrasonic waves in a direction of clothing, based on the
ultrasonic waves, which are reflected by the clothing, are
received through the ultrasonic sensor, acquire sound information based on the received ultrasonic waves, control the
electromagnetic wave sensor to emit the electromagnetic
waves in the direction of the clothing, based on the ultrasonic waves, which are reflected by the clothing, are
received through the ultrasonic sensor, acquire spectrum
information based on the received electromagnetic waves,
and input the sound information and the spectrum informa-
(Continued)

tion in a neural network model to acquire contamination level information about the clothing.

17 Claims, 17 Drawing Sheets

(51) Int. Cl.
    *G01N 22/02*     (2006.01)
    *G01N 21/88*     (2006.01)

(56)       References Cited

U.S. PATENT DOCUMENTS

| | | |
|---|---|---|
| 11,591,736 B2 | 2/2023 | Park |
| 2003/0019253 A1 | 1/2003 | Lorenz et al. |
| 2019/0302091 A1 | 10/2019 | Kessler et al. |
| 2019/0343354 A1 | 11/2019 | Hong et al. |
| 2020/0018005 A1 | 1/2020 | Lee |
| 2020/0041673 A1 | 2/2020 | Ha |
| 2020/0042822 A1 | 2/2020 | Chae |
| 2021/0148033 A1 | 5/2021 | Kessler et al. |
| 2024/0023643 A1* | 1/2024 | Asbeck .................. A41D 13/01 |

FOREIGN PATENT DOCUMENTS

| | | |
|---|---|---|
| KR | 10-2019-0098935 A | 8/2019 |
| KR | 10-2019-0104485 A | 9/2019 |
| KR | 10-2019-0104949 A | 9/2019 |
| KR | 10-2071021 B1 | 1/2020 |
| KR | 10-2020-0018375 A | 2/2020 |

OTHER PUBLICATIONS

Korean Office Action dated Feb. 5, 2026, issued in a Korean Patent Application No. 10-2020-0188365.

* cited by examiner

100

ELECTRONIC DEVICE AND CONTROL METHOD THEREFOR

CROSS-REFERENCE TO RELATED APPLICATION(S)

This application is a continuation application, claiming priority under § 365 (c), of an International application No. PCT/KR2021/019841, filed on Dec. 24, 2021, which is based on and claims the benefit of a Korean patent application number 10-2020-0188365, filed on Dec. 30, 2020, in the Korean Intellectual Property Office, the disclosure of which is incorporated by reference herein in its entirety.

BACKGROUND

1. Field

The disclosure relates to an electronic device and a control method therefor. More particularly, the disclosure relates to an electronic device that uses contamination level information and a control method therefor.

2. Description of Related Art

Spurred by the development of electronic technologies, various types of electronic devices are being developed and distributed. Recently, various types of electronic devices are being developed and distributed to suit users' needs who want newer and more various functions.

Unlike in the past times wherein clothes were managed and washed by using only washing machines, recently, clothes are being managed and maintained, dried, and washed by using various forms of electronic devices such as a clothes management device, a dryer, a dehumidifier, etc.

There are very diverse kinds of cloth that can constitute clothes, and as a person performs activities while wearing clothes, contamination, migration, and foreign substances of clothes cannot help being diverse.

There has been a continuous demand for a device providing optimized methods for maintenance and management, washing, and drying for clothes in consideration of the characteristics of the clothes and the characteristics of contaminants, and for this, there has been a demand for a device and a method for detecting the types and the characteristics of clothes and contaminants with high credibility.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device that acquires contamination level information of clothes by using a plurality of neural network models, and a control method therefor.

Additional aspects will be set forth in part in the description which follows and, in part, will be apparent from the description, or may be learned by practice of the presented embodiments.

In accordance with an aspect of the disclosure, an electronic device is provided. The electronic device includes an ultrasonic sensor, an electromagnetic wave sensor, a memory storing at least one instruction, and a processor electronically connected to the memory, wherein the processor is configured to control the ultrasonic sensor to emit ultrasonic waves in the direction of clothing, based on the ultrasonic waves reflected by the clothing being received through the ultrasonic sensor, acquire acoustic information based on the received ultrasonic waves, control the electromagnetic wave sensor to emit electromagnetic waves in the direction of the clothing, based on the electromagnetic waves reflected by the clothing being received through the electromagnetic wave sensor, acquire spectrum information based on the received electromagnetic waves, and input the acoustic information and the spectrum information into a neural network model and acquire contamination level information of the clothing.

The contamination level information of the clothes may include at least one of a location of a contaminant, a state of the contaminant, a component of the contaminant, an area of the contaminant, and a color of the contaminant, and the state of the contaminant may include at least one of a solid state or a liquid state, and the component of the contaminant may include at least one of a water-soluble component, a fat-soluble component, or a complex component.

Also, the processor may acquire cleaner information for removing a contaminant based on the contamination level information of the clothes, and the cleaner information may include a mixed ratio of each of a fat-soluble cleaner, a water-soluble cleaner, and a complex cleaner.

In addition, the electronic device may further include a communicator and a display, and the processor may transmit the contamination level information of the clothes to an external server through the communicator, and based on receiving information on a method for removing a contaminant corresponding to the contamination level information from the external server, control the display to provide the received information.

Here, the processor may input the acoustic information and the spectrum information into the neural network model and acquire material information of the clothes, and the material information may include at least one of cotton, wool, fur, nylon, polyester, leather, or denim.

Here, the processor may acquire cleaner information corresponding to the material of the clothes based on the contamination level information and the material information, and the cleaner information may include a mixed ratio of each of a fat-soluble cleaner, a water-soluble cleaner, and a complex cleaner.

Also, the electronic device may further include a communicator, and the processor may control the communicator to transmit at least one of the contamination level information, the material information, or the cleaner information to an external device, and the external device may include at least one of a clothes management device, a washing machine, a dryer, or an electric iron.

In addition, the electronic device may further include a display, and the memory may store clothes management information corresponding to each of a plurality of materials, and the processor may acquire clothes management information corresponding to the material of the clothes among the plurality of clothes management information, and provide the acquired clothes management information through the display.

Also, the electronic device may further include a tactile sensor, and the processor may input a friction coefficient acquired through the tactile sensor, the acoustic information, and the spectrum information into the neural network model and acquire the contamination level information.

In accordance with another aspect of the disclosure, an electronic device is provided. The electronic device includes a microscope, an electromagnetic wave sensor, a memory storing at least one instruction, and a processor electronically connected to the memory, wherein the processor is configured to, based on acquiring an enlarged image of the clothes through the microscope, acquire information on the fiber constituting the clothes based on the received enlarged image, and based on the electromagnetic waves reflected by the clothes being received through the electromagnetic wave sensor, acquire spectrum information based on the received electromagnetic waves, and input the information on the fiber and the spectrum information into a neural network model and acquire material information and contamination level information of the clothes.

Here, the processor may acquire clothes management information corresponding to the clothes based on the information on the fiber and the material information.

In accordance with another aspect of the disclosure, an electronic device is provided. The electronic device includes a hyperspectral camera, a memory storing at least one instruction, and a processor electronically connected to the memory, wherein the processor is configured to control the hyperspectral camera to photograph clothes, and based on an image that photographed the clothes being received from the hyperspectral camera, acquire a spectroscopic spectrum per pixel based on the received image, and input the spectroscopic spectrum per pixel into a neural network model and acquire contamination level information of the clothes.

In accordance with another aspect of the disclosure, a control method for an electronic device is provided. The method includes emitting ultrasonic waves in the direction of clothing, based on the ultrasonic waves reflected by the clothing being received, acquiring acoustic information based on the received ultrasonic waves, emitting electromagnetic waves in the direction of the clothing, based on the electromagnetic waves reflected by the clothing being received, acquiring spectrum information based on the received electromagnetic waves, inputting the acoustic information and the spectrum information into a neural network model, and acquiring contamination level information of the clothing.

Here, the contamination level information of the clothes may include at least one of a location of a contaminant, a state of the contaminant, a component of the contaminant, an area of the contaminant, and a color of the contaminant, and the state of the contaminant may include at least one of a solid state or a liquid state, and the component of the contaminant may include at least one of a water-soluble component, a fat-soluble component, or a complex component.

Also, the control method may further include the step of acquiring cleaner information for removing a contaminant based on the contamination level information of the clothes, and the cleaner information may include a mixed ratio of each of a fat-soluble cleaner, a water-soluble cleaner, and a complex cleaner.

In addition, the control method may further include the steps of transmitting the contamination level information of the clothes to an external server, and based on receiving information on a method for removing a contaminant corresponding to the contamination level information from the external server, providing the received information.

Also, the control method may further include the step of inputting the acoustic information and the spectrum information into the neural network model and acquiring material information of the clothes, and the material information may include at least one of cotton, wool, fur, nylon, polyester, leather, or denim.

Here, the control method may further include the step of acquiring cleaner information corresponding to the material of the clothes based on the contamination level information and the material information, and the cleaner information may include a mixed ratio of each of a fat-soluble cleaner, a water-soluble cleaner, and a complex cleaner.

Here, the control method may further include the step of transmitting at least one of the contamination level information, the material information, or the cleaner information to an external device, and the external device may include at least one of a clothes management device, a washing machine, a dryer, or an electric iron.

Also, the electronic device may store clothes management information corresponding to each of a plurality of materials, and the control method may further include the steps of acquiring clothes management information corresponding to the material of the clothes among the plurality of clothes management information, and providing the acquired clothes management information.

According to the various embodiments of the disclosure as described above, the material of clothes and the contamination level of the clothes can be identified.

As the material and the contamination level of clothes are identified specifically, a method for effectively removing a contaminant while minimizing damage to the clothes can be provided to a user, and the method can also be transmitted to a device related to clothes.

Also, a method for identifying the material of clothes and managing and caring the clothes appropriately can be provided to a user, and the method can also be transmitted to a device related to clothes.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
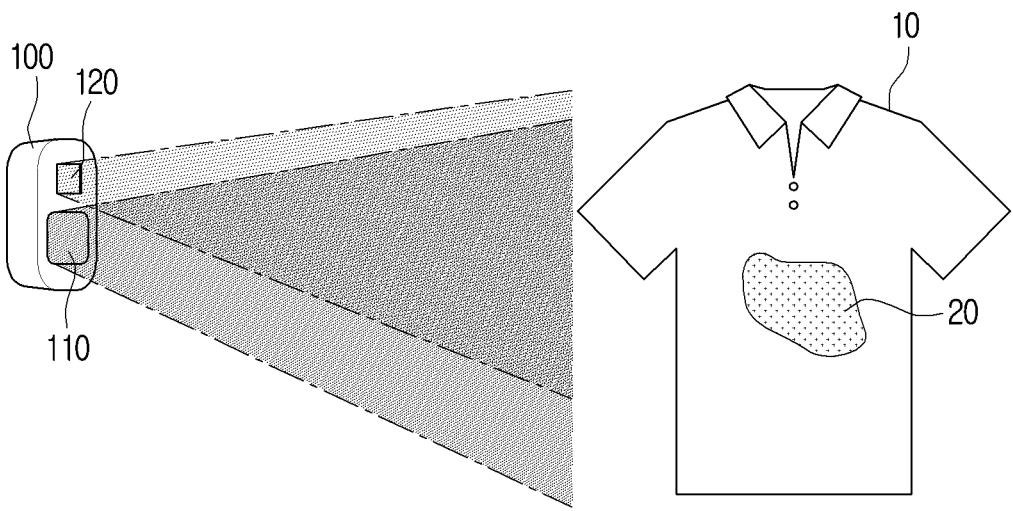
FIG. 1 is a diagram for schematically illustrating an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Also, in this specification, expressions such as "have," "may have," "include," and "may include" denote the existence of such characteristics (e.g.: elements such as numbers, functions, operations, and components), and do not exclude the existence of additional characteristics.

In addition, the expression "at least one of A and/or B" should be interpreted to mean any one of "A" or "B" or "A and B."

Further, the expressions "first," "second," and the like used in this specification may describe various elements regardless of any order and/or degree of importance. Also, such expressions are used only to distinguish one element from another element, and are not intended to limit the elements.

Also, the description in the disclosure that one element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g.: a third element).

Also, in the disclosure, terms such as "include" and "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

Further, in the disclosure, "a module" or "a part" performs at least one function or operation, and may be implemented as hardware or software, or as a combination of hardware and software. Also, a plurality of "modules" or a plurality of "parts" may be integrated into at least one module and implemented as at least one processor (not shown), except "a module" or "a part" that needs to be implemented as specific hardware.

In addition, in this specification, the term "user" may refer to a person who uses an electronic device or a device using an electronic device (e.g.: an artificial intelligence electronic device).

Hereinafter, an embodiment of the disclosure will be described in more detail with reference to the accompanying drawings.

FIG. 1 is a diagram for schematically illustrating an electronic device according to an embodiment of the disclosure.

Referring to FIG. 1, an electronic device 100 according to an embodiment of the disclosure includes a plurality of sensors, and may acquire the material (or, cloth) of the clothes 10, and information on the contamination level of the clothes 10 based on sensing values acquired through the plurality of sensors.

Here, the electronic device 100 may be a component of a device related to clothes, or it may be an independent device. Here, the device related to clothes includes a clothes management device, a washing machine, a dryer, an electric iron, etc., and the electronic device 100 may be a component of the aforementioned device related to clothes, and may acquire the material of the clothes 10, and information on the contamination level of the clothes 10 during driving of the device related to clothes, and transmit the information to a processor (not shown) included in the device related to clothes. Meanwhile, FIG. 1 was illustrated based only on the assumption of clothes worn by a person (e.g., a top, a bottom, underwear, etc.), for the convenience of explanation, but the clothes according to the disclosure obviously includes various forms consisting of fiber such as clothes, a curtain, a carpet, a cover, etc.

As another example, the electronic device 100 may include at least one of a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), a moving picture experts group (MPEG) audio layer 3 (MP3) player, a medical device, a camera, a virtual reality (VR) implementation device, or a wearable device. Here, a wearable device may include at least one of an accessory-type device (e.g.: a watch, a ring, a bracelet, an ankle bracelet, a necklace, glasses, a contact lens, or a head-mounted-device (HMD)), a device integrated with fabrics or clothes (e.g.: electronic clothes), a body-attached device (e.g.: a skin pad or a tattoo), or an implantable circuit. Also, in some embodiments, the electronic device 100 may include, for example, at least one of a television, a digital video disc (DVD) player, an audio, a refrigerator, an air conditioner, a cleaner, an oven, a microwave oven, a clothes management device, a washing machine, a dryer, an electric iron, an air purifier, a set top box, a home automation control panel, a security control panel, a media box (e.g.: Samsung HomeSync™, Apple television (TV)™, or Google TV™), a game console (e.g.: Xbox™, PlayStation™), an electronic dictionary, an electronic key, a camcorder, or an electronic photo frame.

In another embodiment, the electronic device 100 may include at least one of various types of medical instruments (e.g.: various types of portable medical measurement instruments (a blood glucose meter, a heart rate meter, a blood pressure meter, or a thermometer, etc.), magnetic resonance angiography (MRA), magnetic resonance imaging (MRI), computed tomography (CT), a photographing device, or an ultrasonic instrument, etc.), a navigation device, a global navigation satellite system (GNSS), an event data recorder (EDR), a flight data recorder (FDR), a vehicle infotainment device, an electronic device for vessels (e.g.: a navigation device for vessels, a gyrocompass, etc.), avionics, a security device, a head unit for a vehicle, an industrial or a household robot, a drone, an automatic teller's machines (ATM) of a financial institution, a point of sales (POS) of a store, or an Internet of Things (IoT) device (e.g.: a light bulb, various types of sensors, a sprinkler device, a fire alarm, a thermostat, a street light, a toaster, exercise equipment, a hot water tank, a heater, a boiler, etc.).

Hereinafter, for the convenience of explanation, explanation will be described based on the assumption of a case wherein the electronic device 100 is implemented as an independent device including a plurality of sensors.

In particular, the electronic device 100 according to an embodiment of the disclosure may include an ultrasonic sensor 110 and an electromagnetic wave sensor 120. Here, the ultrasonic sensor 110 may emit ultrasonic waves in the direction of the clothes 10, and then receive the ultrasonic waves reflected by the clothes 10 and acquire acoustic information.

The electromagnetic wave sensor 120 may emit electromagnetic waves in the direction of the clothes 10, and then receive the electromagnetic waves reflected by the clothes 10 and acquire spectrum information.

The electronic device 100 according to an embodiment may acquire the contamination level information of the clothes 10, or the material (or, cloth) of the clothes 10 based on the acoustic information and the spectrum information. Detailed explanation in this regard will be described with reference to FIG. 2.

Figure 2:
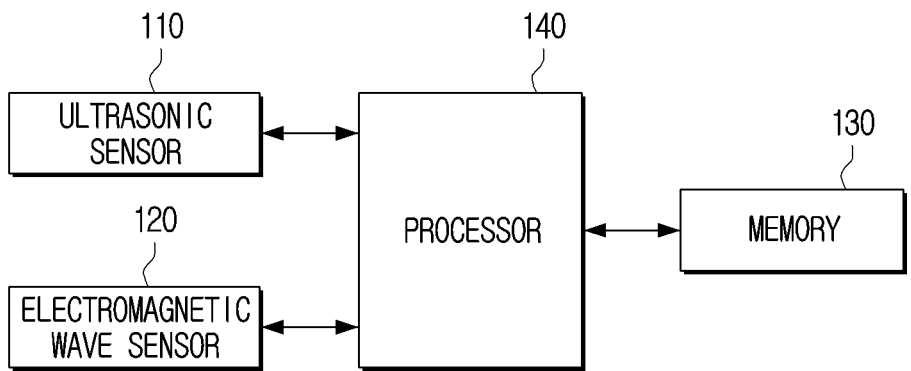
FIG. 2 is a block diagram for illustrating a configuration of an electronic device according to an embodiment of the disclosure.

FIG. 2 is a block diagram for illustrating a configuration of an electronic device according to an embodiment of the disclosure.

Referring to FIG. 2, the electronic device 100 according to an embodiment of the disclosure includes an ultrasonic sensor 110, an electromagnetic wave sensor 120, a memory 130, and a processor 140.

The ultrasonic sensor 110 according to an embodiment is a component that emits (or, radiates) or receives ultrasonic waves. The ultrasonic sensor 110 may emit ultrasonic waves, and receive the ultrasonic waves reflected or refracted by an object, and acquire the distance from the ultrasonic sensor 110 to the object, the direction of the object, or the unique acoustic information of the object. Here, the object may include the clothes 10. The unique acoustic information may include characteristic acoustic impedance (or, characteristic impedance). The characteristic acoustic impendence means a ratio of the negative pressure with respect to the particle speed in a medium, i.e., the clothes 10 or a contaminant. The characteristic acoustic impedance varies according to the material of the clothes 10 or the type of the contaminant, and thus the characteristic acoustic impedance means the unique physical property of the medium.

Detailed explanation in this regard will be described with reference to FIG. 3.

Figure 3:
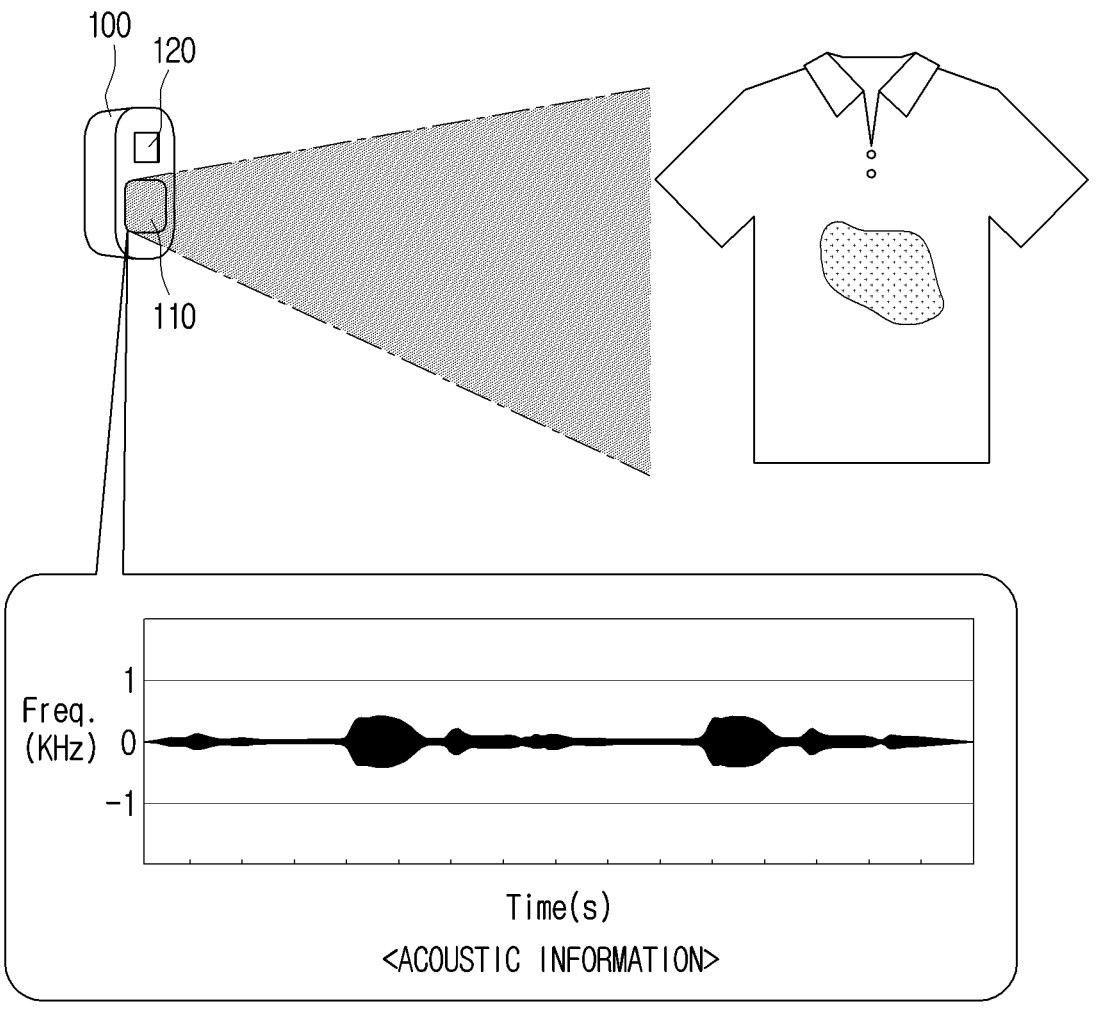
FIG. 3 is a diagram for illustrating an ultrasonic sensor according to an embodiment of the disclosure.

FIG. 3 is a diagram for illustrating an ultrasonic sensor according to an embodiment of the disclosure.

Referring to FIG. 3, the ultrasonic sensor 110 included in the electronic device 100 may emit ultrasonic waves in the direction of the clothes 10 according to control by the processor 140.

Then, the ultrasonic sensor 110 may receive the ultrasonic waves reflected or refracted by the clothes, and the processor 140 may acquire acoustic information, e.g., the characteristic acoustic impedance based on the received ultrasonic waves.

FIG. 3 illustrated that ultrasonic waves are emitted to the entire front surface of the clothes 10, and the ultrasonic waves reflected or refracted by the clothes 10 or the contaminant 20 inside the clothes 10 were received, for the convenience of explanation. However, this is merely an example, and the disclosure is obviously not limited thereto.

As an example, the ultrasonic sensor 110 can obviously emit ultrasonic waves only to a portion of the clothes 10 according to control by the processor 140 or the distance between the ultrasonic sensor 110 and the clothes 10, or emit ultrasonic waves only to a contaminant inside the clothes 10. For example, the ultrasonic sensor 110 may emit ultrasonic waves to a contaminant (e.g., food, wine, cosmetics, dust, ink, etc.) inside the clothes 10, and then receive the ultrasonic waves refracted and reflected by the contaminant. Then, the processor 140 may acquire the characteristic acoustic impedance corresponding to the contaminant based on the received ultrasonic waves.

Returning to FIG. 2, the electronic device 100 according to an embodiment of the disclosure includes the electromagnetic wave sensor 120. The electromagnetic wave sensor 120 according to an embodiment may emit electromagnetic waves in the direction of the clothes 10 in real time, or by a specific time interval according to control by the processor 140, and receive (or, detect) the electromagnetic waves refracted or reflected by the clothes 10. Here, the electromagnetic waves may mean waves that are generated as the electric field and the magnetic field change according to time. The electromagnetic waves include X-rays, infrared rays, ultraviolet rays, radio waves, microwaves, etc. other than visible rays.

For example, the electromagnetic wave sensor 120 included in the electronic device 100 may emit (or, release) infrared rays in a wavelength of 0.76 μm to 400 μm. Then, the electromagnetic wave sensor 120 may receive (or, collect) the infrared rays reflected by the clothes 10, and the processor 140 may acquire a spectroscopic spectrum based on the reflected infrared rays. Here, the spectroscopic spectrum is a spectrum that indicates the transmittance rate of a material (e.g., the clothes 10 or a contaminant inside the clothes 10) with respect to the infrared rays of each wavelength. As each material has its unique spectroscopic spectrum, the processor 140 may identify the material of the clothes 10 and the type of the contaminant by using the spectroscopic spectrum.

Detailed explanation in this regard will be described with reference to FIG. 4.

Figure 4:
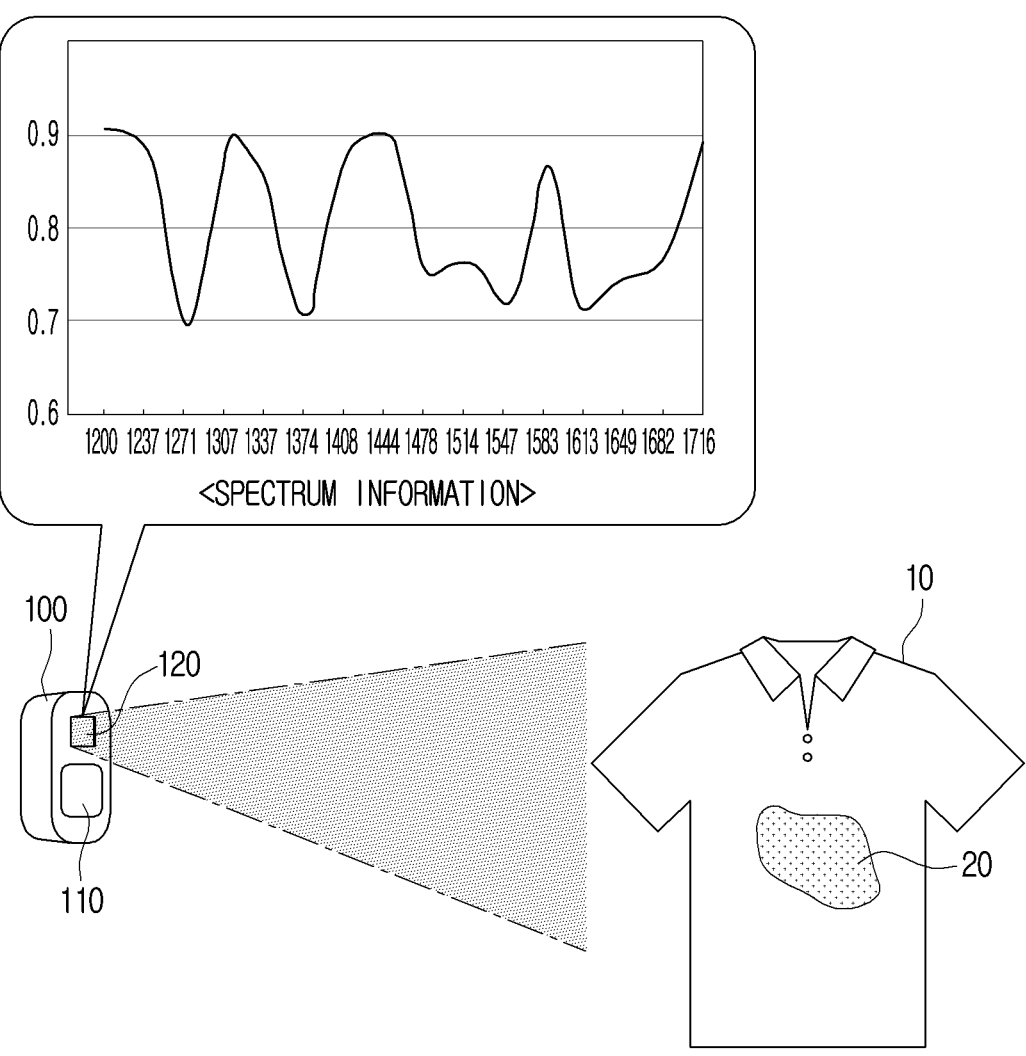
FIG. 4 is a diagram for illustrating an electromagnetic wave sensor according to an embodiment of the disclosure.

FIG. 4 is a diagram for illustrating an electromagnetic wave sensor according to an embodiment of the disclosure.

Referring to FIG. 4, the electromagnetic wave sensor 120 included in the electronic device 100 may emit electromagnetic waves in the direction of the clothes 10 according to control by the processor 140. For example, the electromagnetic wave sensor 120 may be implemented as a near-infrared spectrometer, and operate in a wavelength range of 900 nm to 1,700 nm. The processor 140 may control the electromagnetic wave sensor 120 to emit near-infrared rays in the direction of the clothes 10, and acquire a spectroscopic spectrum by using the near-infrared spectrometer. Then, the processor 140 may identify the material (e.g., the cloth, the composition ratio of fiber) of the clothes 10, the type of the contaminant, etc. based on the spectroscopic spectrum.

Meanwhile, as explained in FIG. 3, FIG. 4 illustrated that the electromagnetic wave sensor 120 emits electromagnetic waves to the entire front surface of the clothes 10, and receives the electromagnetic waves reflected or refracted by the clothes 10 or the contaminant inside the clothes 10, for the convenience of explanation. However, this is merely an example, and the disclosure is obviously not limited thereto.

Returning to FIG. 2, the electronic device 100 according to an embodiment of the disclosure includes a memory 130.

The memory 130 may be implemented as an internal memory such as a read-only memory (ROM) (e.g., an electrically erasable programmable read-only memory (EE-PROM)), a random access memory (RAM), etc. included in the processor 140, or implemented as a separate memory from the processor 140. In this case, the memory 130 may be implemented in the form of a memory embedded in the electronic device 100, or in the form of a memory that can be attached to or detached from the electronic device 100, according to the usage of stored data. For example, in the case of data for operating the electronic device 100, the data may be stored in a memory embedded in the electronic device 100, and in the case of data for an extended function of the electronic device 100, the data may be stored in a memory that can be attached to or detached from the electronic device 100. Meanwhile, in the case of a memory embedded in the electronic device 100, the memory may be implemented as at least one of a volatile memory (e.g.: a dynamic RAM (DRAM), a static RAM (SRAM), or a synchronous dynamic RAM (SDRAM), etc.) or a non-volatile memory (e.g.: an one time programmable ROM (OTPROM), a programmable ROM (PROM), an erasable and programmable ROM (EPROM), an electrically erasable and programmable ROM (EEPROM), a mask ROM, a flash ROM, a flash memory (e.g.: NAND flash or NOR flash, etc.), a hard drive, or a solid state drive (SSD)). Also, in the case of a memory that can be attached to or detached from the electronic device 100, the memory may be implemented in a form such as a memory card (e.g., compact flash (CF), secure digital (SD), micro secure digital (Micro-SD), mini secure digital (Mini-SD), extreme digital (xD), a multi-media card (MMC), etc.), an external memory that can be connected to a universal serial bus (USB) port (e.g., a USB memory), etc.

In particular, the memory 130 according to an embodiment of the disclosure may store a neural network model 1.

The electronic device 100 according to an embodiment of the disclosure includes a processor 140, and the processor 140 controls the overall operations of the electronic device 100.

According to an embodiment, the processor 140 may be implemented as a digital signal processor (DSP) processing digital image signals, a microprocessor, an artificial intelligence (AI) processor, a timing controller (T-CON). However, the disclosure is not limited thereto, and the processor 140 may include one or more of a central processing unit (CPU), a micro controller unit (MCU), a micro processing unit (MPU), a controller, an application processor (AP), or a communication processor (CP), and an advanced instruction set computer (RISC) machines (ARM) processor, or may be defined by the terms. Also, the processor 140 may be implemented as a system on chip (SoC) having a processing algorithm stored therein or large scale integration (LSI), or in the form of a field programmable gate array (FPGA).

Functions related to artificial intelligence according to the disclosure are operated through the processor 140 and the memory 130. The processor 140 may consist of one or a plurality of processors. Here, the one or plurality of processors may be generic-purpose processors such as a CPU, an AP, a digital signal processor (DSP), etc., graphic-dedicated processors such as a graphics processing unit (GPU), a vision processing unit (VPU), etc., or artificial intelligence-dedicated processors such as a numeric processing unit (NPU). The one or plurality of processors perform control to process input data according to predefined operation rules or an artificial intelligence model stored in the memory 130. Alternatively, in case the one or plurality of processors are artificial intelligence-dedicated processors, the artificial intelligence-dedicated processors may be designed as a hardware structure specified for processing of a specific artificial intelligence model.

In particular, as described above, the processor 140 may acquire acoustic information (e.g., the characteristic acoustic impedance) based on ultrasonic waves received through the ultrasonic sensor 110, and acquire spectrum information based on electromagnetic waves received through the electromagnetic wave sensor 120.

Then, the processor 140 may input the acoustic information and the spectrum information into the neural network model, and acquire contamination level information of the clothes 10.

Detailed explanation in this regard will be described with reference to FIG. 5.

Figure 5:
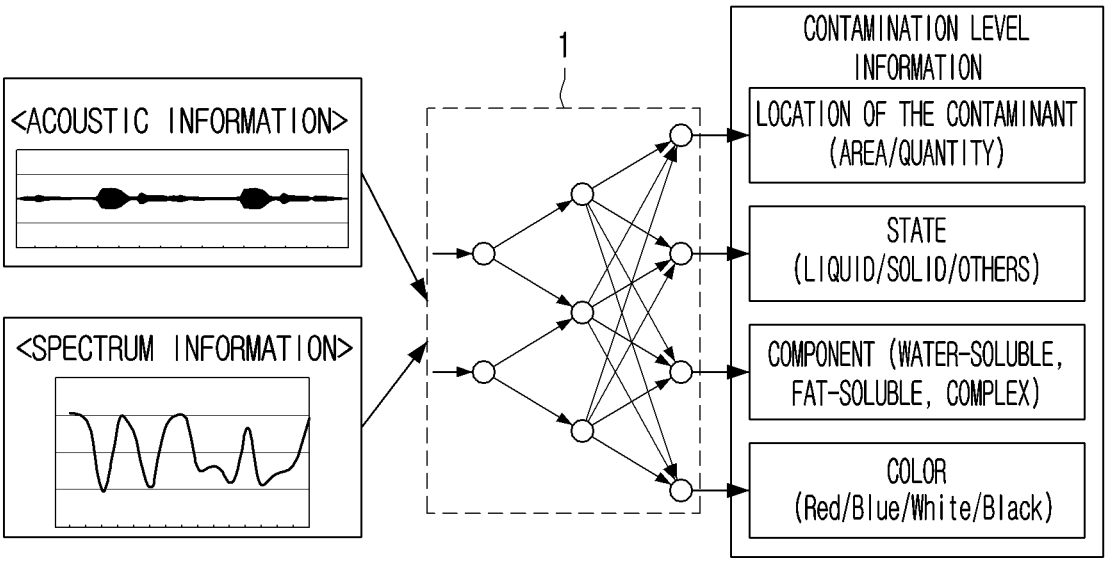
FIG. 5 is a diagram for illustrating contamination level information according to an embodiment of the disclosure.

FIG. 5 is a diagram for illustrating contamination level information according to an embodiment of the disclosure.

Referring to FIG. 5, the processor 140 may input acoustic information and spectrum information into the neural network model 1, and acquire contamination level information. Here, the contamination level information may include at least one of the location of a contaminant inside the clothes 10, the state of the contaminant, the component of the contaminant, the area (or, the quantity, the size, the thickness) of the contaminant, or the color of the contaminant. Meanwhile, the contaminant obviously includes foreign substances and the migration degree other than a contaminant.

Here, the state of the contaminant may mean any one of liquid, solid, or semi-solid. Also, the component of the contaminant may mean any one of water solubility, fat solubility (or, oil solubility), or complexity (e.g., a mixed ratio of water solubility and fat solubility).

The neural network model 1 according to an embodiment of the disclosure may be a model trained to output contamination level information including at least one of the location, the state, the component, the area, or the color of a contaminant inside the clothes 10 based on the acoustic component and the spectrum information.

Meanwhile, the feature that a neural network model or an artificial intelligence model is trained means that a basic artificial intelligence model (e.g., an artificial intelligence model including any random parameters) is trained by using a plurality of training data by a learning algorithm, and predefined operation rules or an artificial intelligence model set to perform desired characteristics (or, purposes) are thereby made. Such learning may be performed through a separate server and/or system, but is not limited thereto, and it may be performed in the electronic device 100. As examples of learning algorithms, there are supervised learning, unsupervised learning, semi-supervised learning, transfer learning, or reinforcement learning, but learning algorithms in the disclosure are not limited to the aforementioned examples.

The neural network model 1 according to an embodiment may be implemented as a convolutional neural network (CNN), a recurrent neural network (RNN), a restricted Boltzmann Machine (RBM), a deep belief network (DBN), a bidirectional recurrent deep neural network (BRDNN), or deep Q-networks, etc., but the disclosure is not limited to the aforementioned examples.

Returning to FIG. 2, the processor 140 according to an embodiment of the disclosure may acquire cleaner information for removing a contaminant based on the contamination level information of the clothes 10.

Detailed explanation in this regard will be described with reference to FIG. 6.

Figure 6:
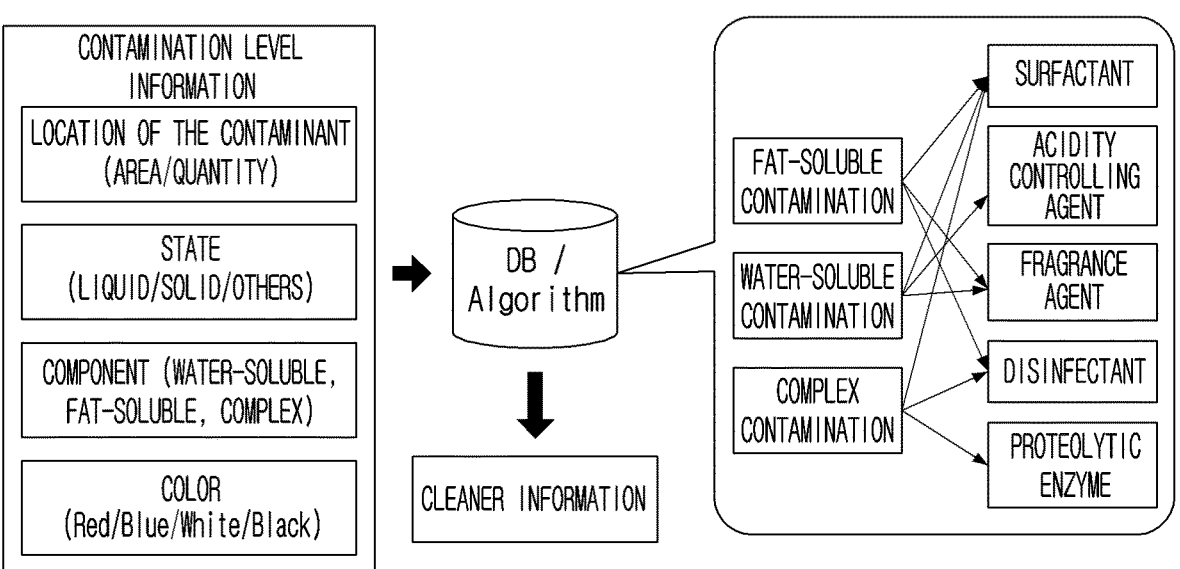
FIG. 6 is a diagram for illustrating cleaner information according to an embodiment of the disclosure.

FIG. 6 is a diagram for illustrating cleaner information according to an embodiment of the disclosure.

Referring to FIG. 6, the memory 130 according to an embodiment of the disclosure may store cleaner information corresponding to each of a plurality of contamination level information in the form of a data base (DB) or a form of an algorithm.

For example, a DB stored in the memory 130 may include information on the quantity of cleaners required for removing a contaminant according to the location of the contaminant and the area of the contaminant included in the contamination level information.

As another example, an algorithm stored in the memory 130 may calculate the quantity of cleaners required for removing a contaminant by using the location of the contaminant and the area of the contaminant included in the contamination level information as parameters.

Also, the DB stored in the memory 130 may include information on a combination of cleaners required for removing a contaminant according to the component of the contaminant (e.g., a water-soluble component, a fat-soluble component, or a complex component) and the color of the contaminant included in the contamination level information.

Here, the information on a combination of cleaners may include information on cleaners required for removing the contaminant among various types of cleaners such as a surfactant, an acidity controlling agent, a fragrance agent, a disinfectant, a proteolytic enzyme, etc.

As another example, the algorithm stored in the memory 130 may calculate a combination and a mixed ratio of cleaners required for removing the contaminant by using the component of the contaminant and the color of the contaminant included in the contamination level information as parameters.

For example, referring to FIG. 6, if a contaminant inside the clothes 10 is identified as an oil-soluble contaminant, the processor 140 may acquire a combination and a mixed ratio of a surfactant, a fragrance agent, and a disinfectant as information on cleaners for removing the oil-soluble contaminant by using the algorithm stored in the memory 130.

As another example, if a contaminant inside the clothes 10 is identified as a water-soluble contaminant, the processor 140 may acquire a combination and a mixed ratio of a surfactant, an acidity controlling agent, and a fragrance agent as information on cleaners for removing the water-soluble contaminant by using the algorithm.

The aforementioned examples are for the convenience of explanation, and the disclosure is obviously not limited thereto. For example, various combinations among a plurality of cleaners can obviously be acquired according to the component of a contaminant. For example, if the component of a contaminant is identified as a protein contaminant, the processor 140 can obviously acquire a combination of a surfactant, a disinfectant, and a proteolytic enzyme, and a mixed ratio of each of them.

The electronic device 100 according to an embodiment may provide an acquired combination to a user through an output part (e.g., a display), or in case the electronic device 100 includes a dispenser (not shown) for spraying a cleaner on its own, the electronic device 100 can obviously control the dispenser to correspond to the acquired combination. The cleaner information illustrated in FIG. 6 may mean the acquired combination and mixed ratio of cleaners.

As still another example, the processor 140 can obviously acquire cleaner information by inputting the contamination level information into the neural network model 1. For example, the neural network model 1 is a model trained to output cleaner information based on various training data, and here, the training data may include an optimal combination and an optimal mixed ratio of cleaners for removing the contaminant according to the location, the state, the component, and the color of the contaminant.

For example, in case 10 g of red paint (oil-soluble) is sprayed in a circular and solid form in the thickness of 0.2 mm (contamination level information), the training data may include a combination and a mixed ratio of a surfactant, ethanol, and benzyl alcohol as cleaner information.

Returning to FIG. 2, in the aforementioned example, explanation was described based only on the assumption of a case wherein the processor 140 acquired the contamination level information. However, this is merely an example, and the disclosure is obviously not limited thereto.

The processor 140 according to an embodiment can obviously acquire material information of the clothes 10 by inputting acoustic information and spectrum information into the neural network model 1.

Detailed explanation in this regard will be described with reference to FIG. 7.

Figure 7:
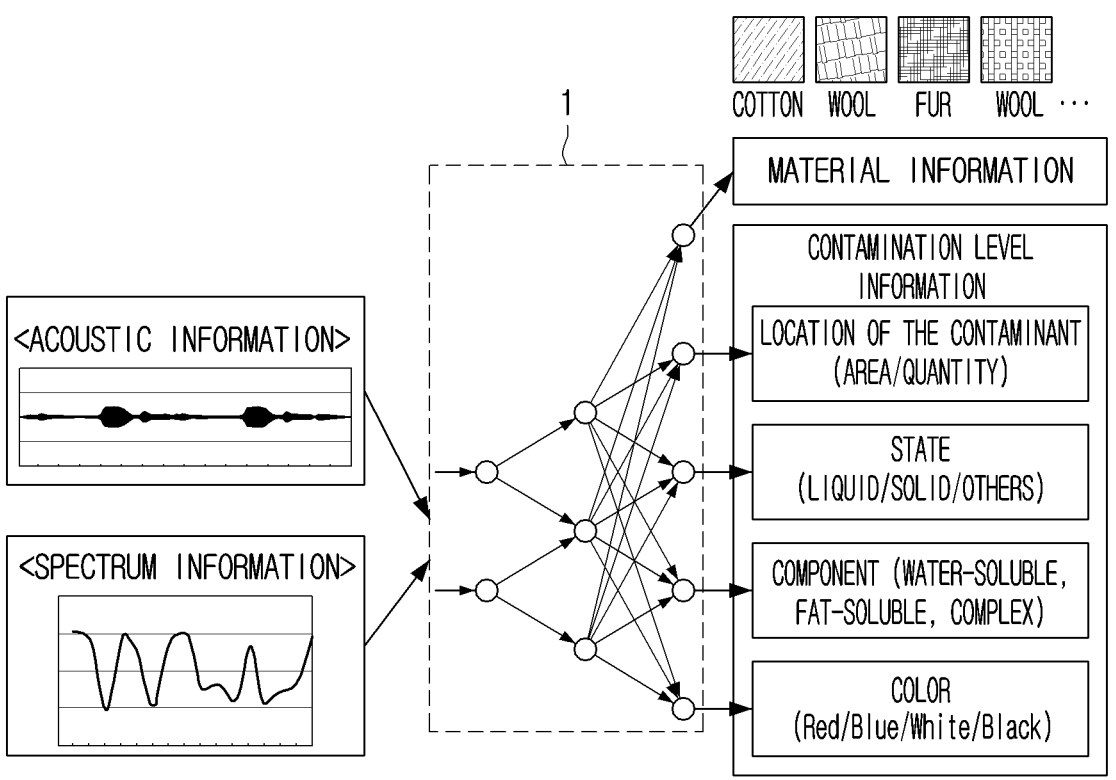
FIG. 7 is a diagram for illustrating material information according to an embodiment of the disclosure.

FIG. 7 is a diagram for illustrating material information according to an embodiment of the disclosure.

Referring to FIG. 7, the neural network model 1 may output the material information of the clothes 10 and the contamination level information of a contaminant inside the clothes 10 by using the acoustic information and the spectrum information.

For example, the neural network model 1 may classify the material of the clothes 10 by using the acoustic information and the spectrum information. Here, the material information may include cotton, wool, fur, nylon, polyester, leather, or denim, etc. However, this is merely an example, and in case the clothes 10 consists of various materials, the material information can obviously include the ratio of each of the various materials constituting the clothes 10.

The neural network model 1 according to an embodiment of the disclosure may be a model trained based on a plurality of training data including the acoustic information and the spectrum information, and the material information corresponding thereto.

Figure 8:
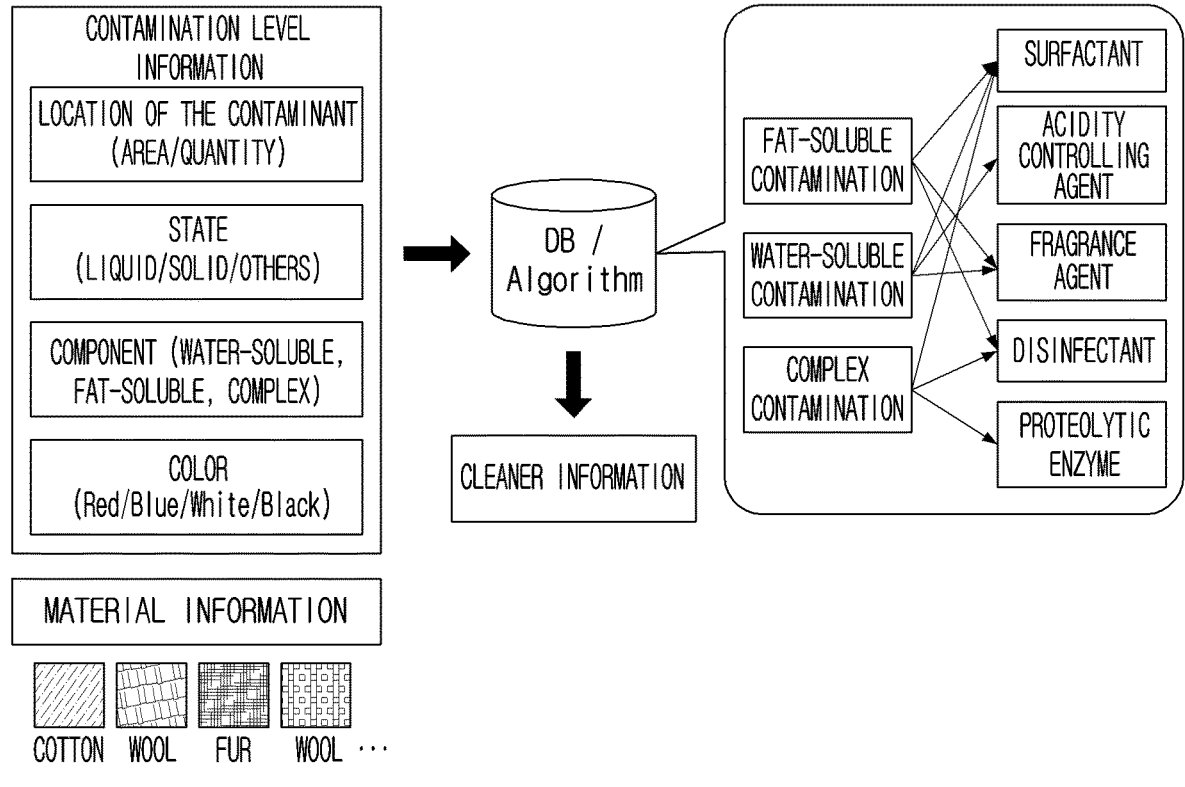
FIG. 8 is a diagram for illustrating cleaner information according to material information according to an embodiment of the disclosure.

FIG. 8 is a diagram for illustrating cleaner information according to material information according to an embodiment of the disclosure.

Referring to FIG. 8, the processor 140 according to an embodiment of the disclosure may acquire cleaner information corresponding to the material of the clothes 10 based on the contamination level information and the material information.

For example, the memory 130 is in the form of a look-up table, and may include cleaner information corresponding to each material. Here, the cleaner information may include a combination and a mixed ratio of cleaners appropriate for the material of the clothes 10 among cleaners in various forms such as a fat-soluble cleaner, a water-soluble cleaner, and a complex cleaner, etc.

However, this is merely an example, and the cleaner information can obviously further include a washing method corresponding to the material of the clothes 10 (e.g., water washing, a neutral detergent, dry cleaning, etc.).

As illustrated in FIG. 6 and FIG. 8, the processor 140 may acquire cleaner information including a combination and a mixed ratio of cleaners that are appropriate for the clothes 10 and are for removing a contaminant based on the material information and the contamination level information of the clothes 10.

Meanwhile, the cleaners and the washing method appropriate for the clothes 10 mean cleaners and a washing method that remove the contaminant inside the clothes 10 while minimizing damage to the cloth based on the material (or, the cloth, the fiber) characteristic of the clothes 10.

Figure 9:
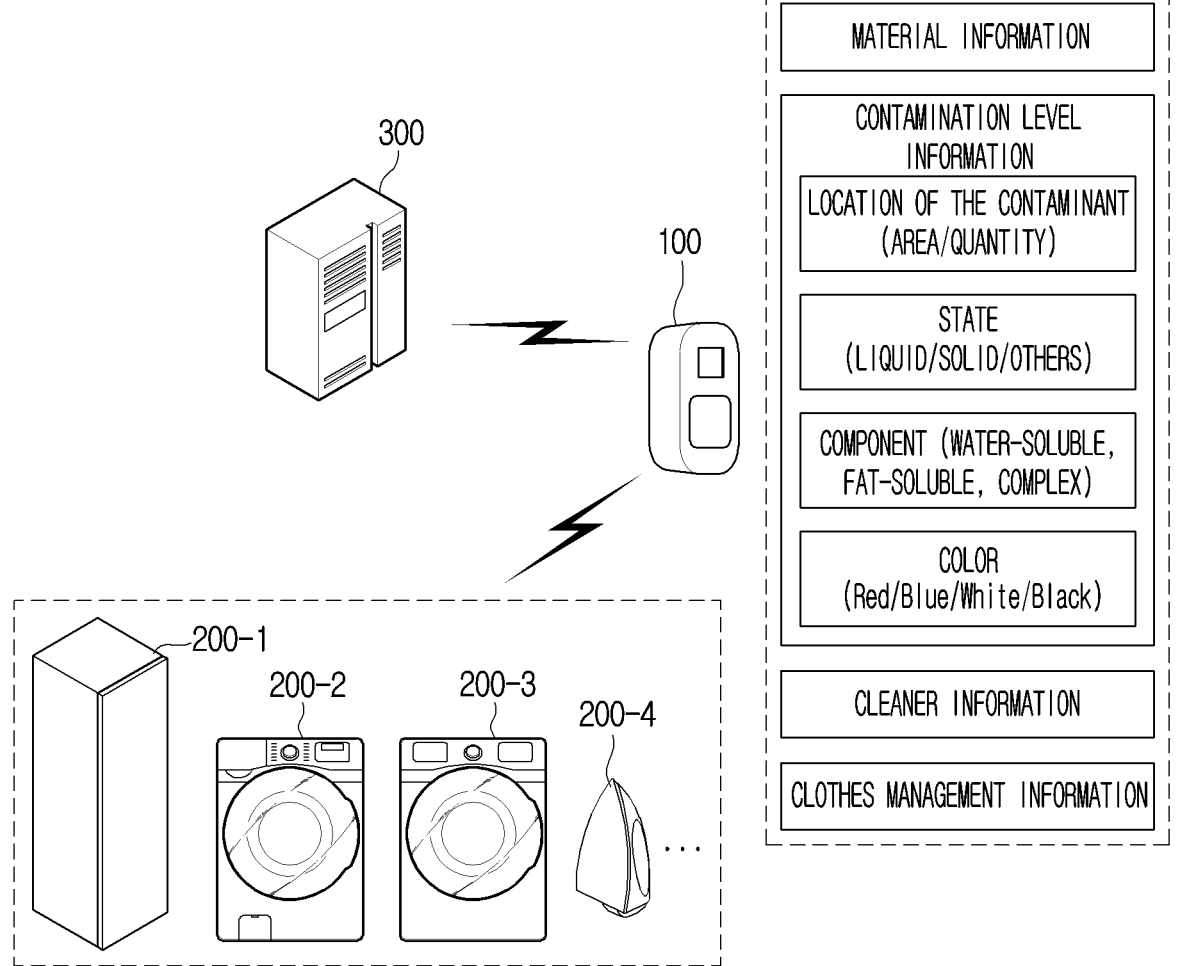
FIG. 9 is a diagram for illustrating an electronic device communicating with an external device according to an embodiment of the disclosure.

FIG. 9 is a diagram for illustrating an electronic device communicating with an external device according to an embodiment of the disclosure.

The electronic device 100 according to an embodiment of the disclosure may further include a communicator (not shown), and may perform communication with an external device through the communicator.

In particular, the electronic device 100 may transmit at least one of the material information, the contamination level information, the cleaner information, or the clothes management information of the clothes 10 to an external device. Here, the external device is a device related to clothes, and may manage the clothes 10 by using the material information and the contamination level information received from the electronic device 100.

For example, the device related to clothes may include a clothes management device 200-1, a washing machine 200-2, a dryer 200-3, an electric iron 200-4, etc. However, this is merely an example, and the disclosure is obviously not limited thereto. As an example, the indoor temperature/humidity are elements influencing the clothes 10, and thus an air conditioner (not shown), a dehumidifier (not shown), a fan (not shown), etc. controlling the indoor temperature/humidity can obviously be included in the device related to clothes.

According to an embodiment, the washing machine 200-2, the dryer 200-3, etc. may set a washing course, a drying course, etc. by using the material information and the contamination level information received from the electronic device 100.

For example, if the material information and the cleaner information of the clothes 10 are received as wool from the electronic device 100, the washing machine 200-2 may control the dispenser included inside the washing machine 200-2 that sprays detergents to spray only a wool-exclusive detergent.

As another example, if it is identified that the clothes 10 is a material (or, cloth) weak against a high temperature based on the material information of the clothes 10, the dryer 200-3 may dry the clothes 10 at a low temperature lower than a threshold temperature.

As still another example, when the material information of the clothes 10 is received from the electronic device 100, the electric iron 200-4 may automatically set the temperature of the electric iron 200-4 as a temperature corresponding to the material information of the clothes 10.

The aforementioned operations and functions of an external device are merely examples, and the disclosure is obviously not limited thereto. For example, if it is identified that a large amount of water was smeared on the clothes 10 based on the contamination level information, the electronic device 100 may control the operation of the dehumidifier such that the clothes 10 is dried within a short time, and the dehumidifier may adjust the dehumidification strength based on the contamination level information received from the electronic device 100.

Meanwhile, the electronic device 100 according to an embodiment of the disclosure may acquire cleaner information corresponding to the contamination level information of the clothes 10 on its own, and as another example, the electronic device 100 may transmit the contamination level information to an external server 300 through the communicator, and then receive information on a method for removing the contaminant corresponding to the contamination level information from the external server 300.

For example, the electronic device 100 may not identify appropriate cleaner information for removing the contaminant inside the clothes 10, and in this case, the electronic device 100 may transmit the contamination level information to the external server 300, and receive search results for cleaner information for removing the contaminant inside the clothes 10, a method for removing the contaminant, etc.

The memory 130 according to an embodiment of the disclosure may store clothes management information corresponding to each of a plurality of materials.

The clothes management information may include whether water washing is possible, an appropriate temperature in the case of water washing, whether dry cleaning is possible, a drying method, an ironing method, etc. according to the materials.

Here, the drying method may include whether it would be appropriate for hanging the clothes on a hanger and drying the clothes in the sunlight or in a shade, whether machine drying (a dryer) can be used, etc. according to the materials.

The ironing method may include whether ironing is possible, an appropriate temperature in the case of ironing, whether steam ironing is possible, etc. according to the materials.

When the material of the clothes 10 is identified, the processor 140 according to an embodiment of the disclosure may acquire clothes management information corresponding to the material. Then, the processor 140 may transmit the clothes management information to the device related to clothes. The device related to clothes may manage (e.g., wash, dry, iron, sterilize, etc.) to be appropriate for the material of the clothes 10 based on the clothes management information received from the electronic device 100.

Figure 10:
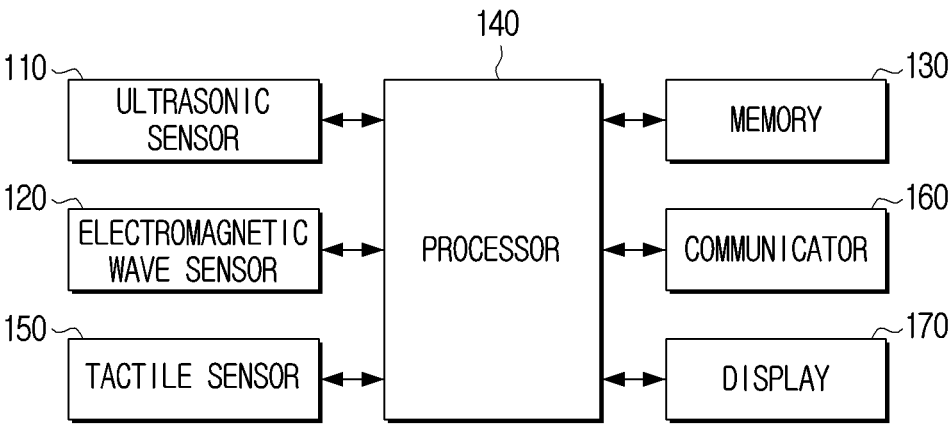
FIG. 10 is a detailed block diagram for illustrating a configuration of an electronic device according to an embodiment of the disclosure.

FIG. 10 is a detailed block diagram for illustrating a configuration of an electronic device according to an embodiment of the disclosure.

Referring to FIG. 10, the electronic device 100 may include an ultrasonic sensor 110, an electromagnetic wave sensor 120, a memory 130, a processor 140, a tactile sensor 150, a communicator 160, and a display 170.

Among the plurality of components included in the electronic device 100, regarding the components described in FIG. 2, overlapping explanation will be excluded.

The tactile sensor 150 according to an embodiment of the disclosure may detect the resistance, the capacitance, the voltage, the frequency, the slipping degree, etc. of an object through physical contact with the object.

The tactile sensor 150 according to an embodiment may detect the friction coefficient of the clothes 10 and the characteristics of the surface, e.g., the shape of the fiber threads constituting the clothes 10, the surface of the threads, the thickness of the threads, the weaving pattern, the texture, etc. through physical contact with the clothes 10.

Here, the tactile sensor 150 may be implemented in various forms such as a tactile sensor based on silicon, a tactile sensor based on a polymer, a pressure sensor, an acceleration sensor, etc. For example, the tactile sensor 150 may include a micromini spring in an nm unit implemented as special metal, and modify the elasticity of the spring generated as the tactile sensor 150 physically contacts the clothes 10 into an electronic signal, and detect the pressure, the friction coefficient, and the texture of the clothes 10 based on the modified electronic signal.

Then, the processor 140 may input the friction coefficient received from the tactile sensor 150, the acoustic information received from the ultrasonic sensor 110, and the spectrum information received from the electromagnetic wave sensor 120 into the neural network model 1, and acquire the material or the contamination level information of the clothes 10.

Detailed explanation in this regard will be described with reference to FIG. 11.

Figure 11:
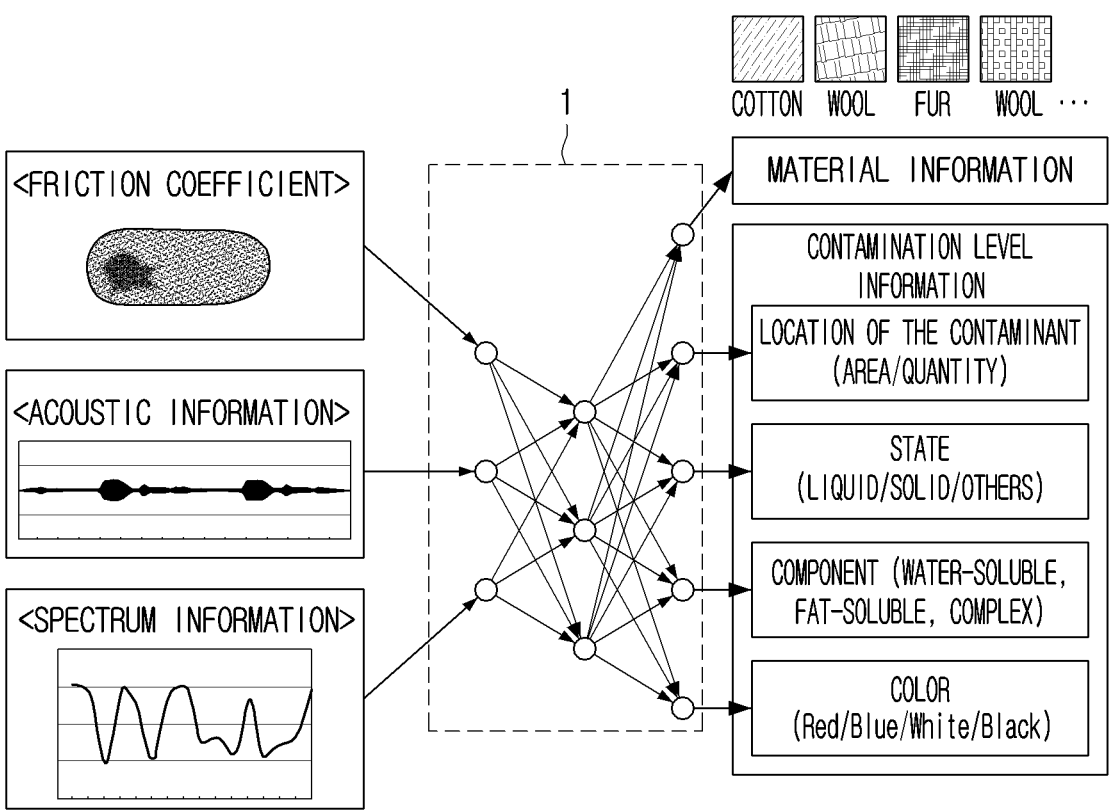
FIG. 11 is a diagram for illustrating a friction coefficient according to an embodiment of the disclosure.

FIG. 11 is a diagram for illustrating a friction coefficient according to an embodiment of the disclosure.

Referring to FIG. 11, the processor 140 may input the friction coefficient, the acoustic information, and the spectrum information into the neural network model 1, and acquire the material or the contamination level information of the clothes 10. Here, the friction coefficient is an example of a sensing value received through the tactile sensor 150, and is obviously not limited thereto. For example, if the texture of the clothes 10, the shape of the fiber threads, etc. are received from the tactile sensor 150, the processor 140 may input them into the neural network model 1, and acquire the material or the contamination level information of the clothes 10.

Meanwhile, although not illustrated in FIG. 10, the electronic device 100 may include a driver. Here, the driver means a polyarticular robot that includes a motor, etc. and is like a human arm, and in the end part of the driver, the ultrasonic sensor 110, the electromagnetic wave sensor 120, and the tactile sensor 150 may be disposed.

Then, the processor 140 may control the driver and locate the ultrasonic sensor 110, the electromagnetic wave sensor 120, and the tactile sensor 150 to be close to the clothes 10, or make them physically contact the clothes 10.

The communicator 160 according to an embodiment of the disclosure transmits and receives various data with an external device. For example, the communicator 160 may receive inputs of various data from an external device (e.g., a device related to clothes), an external storage medium (e.g., a USB memory), an external server (e.g., a webhard), etc. through communication methods such as Wi-Fi based on AP (a Wireless local area network (LAN) network), Bluetooth, Zigbee, a wired/wireless Local Area Network (LAN), a Wide Area Network (WAN), Ethernet, Institute of Electrical and Electronics Engineers (IEEE) 1394, a High-Definition Multimedia Interface (HDMI), a Universal Serial Bus (USB), a Mobile High-Definition Link (MHL), Audio Engineering Society/European Broadcasting Union (AES/EBU), Optical, Coaxial, etc.

As described above, the processor 140 may transmit the material of the clothes 10, the contamination level information, and the clothes management information corresponding to the material of the clothes 10 to the device related to clothes (e.g., the clothes management device 200-1, the washing machine 200-2, the dryer 200-3, the electric iron 200-4), and the external server 300.

As another example, the processor 140 may transmit the acoustic information, the spectrum information, etc. to the external server 300, and receive the material of the clothes 10, the contamination level information, the clothes management information, etc. from the external server 300.

The display 170 according to an embodiment of the disclosure may be implemented as displays in various forms such as a liquid crystal display (LCD), an organic light-emitting diode (OLED), liquid crystal on silicon (LCoS), digital light processing (DLP), a quantum dot (QD) display panel, quantum dot light-emitting diodes (QLED), micro light-emitting diodes (uLED), and a mini LED, etc. Meanwhile, the electronic device 100 may also be implemented as a touch screen combined with a touch sensor, a flexible display, a rollable display, a three dimensional (3D) display, a display to which a plurality of display modules are physically connected, etc.

The processor 140 according to an embodiment may control the display 170 to display at least one of the material of the clothes 10, the contamination level information, the method for removing the contaminant, or the clothes management information corresponding to the material of the clothes 10 acquired through the neural network model 1.

From a user's viewpoint, the contaminant inside the clothes 10 may be removed by using the method for removing the contaminant provided through the display 170, and the clothes 10 may be appropriately managed by using the clothes management information.

For example, for removing the contaminant, e.g., gum according to control by the processor 140, the display 170 may display 'you should harden the gum by making the clothes in a low temperature state, and scrape off the gum' as the method for removing the contaminant. From a user's viewpoint, the electronic device 100 may identify (contamination level information) that gum was smeared on the clothes 10, and then automatically search a method for removing the gum, and then provide the search result through the display 170, without a process of searching a method for removing the gum through a separate device.

Figure 12:
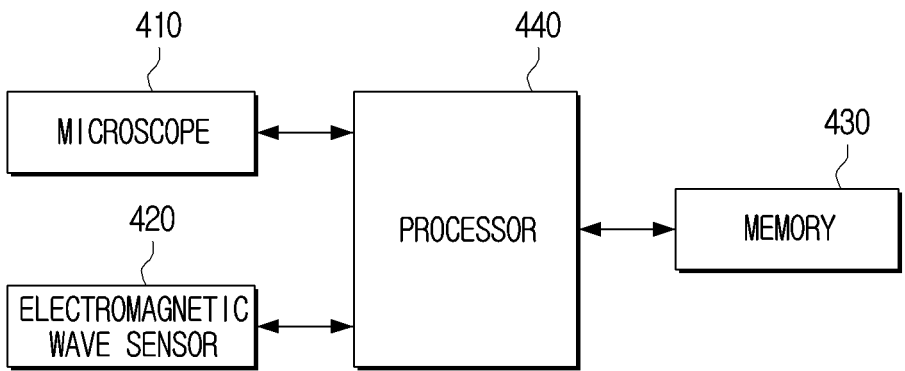
FIG. 12 is a diagram for illustrating an electronic device according to an embodiment of the disclosure.

FIG. 12 is a diagram for illustrating an electronic device according to an embodiment of the disclosure.

Referring to FIG. 12, the electronic device 400 according to another embodiment of the disclosure may include a microscope 410, an electromagnetic wave sensor 420, a memory 430, and a processor 440.

Meanwhile, the various embodiments of the disclosure described with reference to FIGS. 1 to 11 can obviously correspond to the embodiment of the electronic device 400 illustrated in FIG. 12.

As an example, when the processor 440 acquires an enlarged image of the clothes 10 through the microscope 410, the processor 440 may acquire information on the fiber constituting the clothes 10 based on the enlarged image.

Here, the microscope 410 may provide an enlarged image of an object according to a specific magnification. For example, the microscope 410 may be located to be adjacent to the clothes 10 according to moving by the driver (not shown) or a user, and the microscope 410 may provide an enlarged image of the surface of the clothes 10. As an example, the microscope 410 may provide an image which enlarged the surface of the clothes 10 by 1 to 500 times or a magnification greater than that according to the magnification of the lens included in the microscope 410 to the processor 440. The microscope 410 may acquire an enlarged image by photographing the surface of the clothes 10 according to a photographing command by a user, or acquire an enlarged image by automatically photographing the surface of the clothes 10 when the electronic device 400 becomes close to the surface of the clothes 10 within a specific distance.

Also, as described in FIG. 2, the processor 440 may acquire spectrum information based on electromagnetic waves received from the electromagnetic wave sensor 420.

Then, the processor 440 may input the information on the fiber acquired based on the enlarged image and the spectrum information into the neural network model 1, and acquire the material information and the contamination level information of the clothes 10.

Here, the neural network model 1 may be a model trained to output the contamination level information including at least one of the location, the state, the component, the area, or the color of the contaminant inside the clothes 10, and the material of the clothes 10 based on the information on the fiber and the spectrum information.

Here, the information on the fiber acquired based on the enlarged image may include the shape of the fiber threads, the surface, the thickness, the weaving pattern, the color, the abrasion degree, etc. of the clothes 10, and the enlarged magnification of the enlarged image may be proportionate to the performance (e.g., the magnification, the focal distance, etc.) of the lens included in the microscope 410.

Detailed explanation in this regard will be described with reference to FIG. 13.

Figure 13:
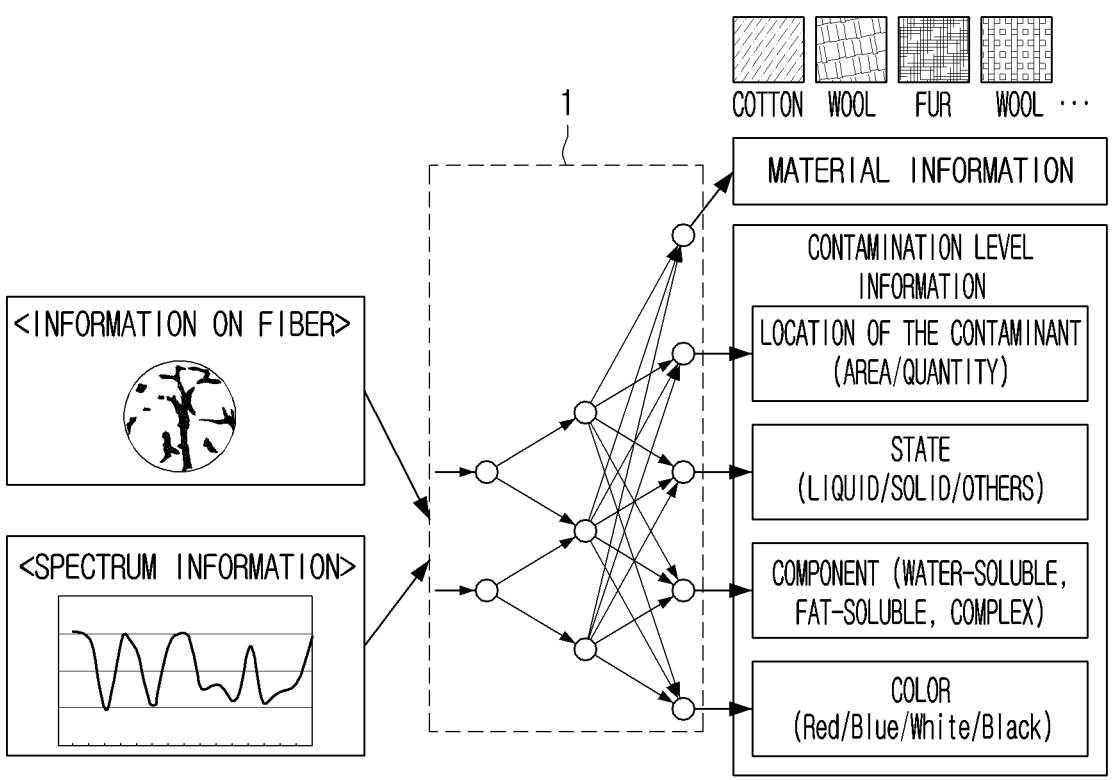
FIG. 13 is a diagram for illustrating information on fiber according to an embodiment of the disclosure.

FIG. 13 is a diagram for illustrating information on fiber according to an embodiment of the disclosure.

Referring to FIG. 13, the processor 440 may acquire information on the fiber constituting the clothes 10 based on an image that photographed the clothes 10 by magnifying the clothes 10 by a specific magnification. According to an embodiment of the disclosure, the processor 440 may identify the material (e.g., cotton, hemp, wool, silk, synthetic fiber, denim, fur, leather, suede, etc.) of the clothes 10 and the mixed ratio (e.g., cotton 70%, acryl 30%, etc.) based on the shape of the fiber threads, the surface of the threads, and the thickness of the threads included in the information on the fiber.

Also, the processor 440 may identify the type of the contaminant based on the enlarged image. Here, the type of the contaminant may include water soluble (e.g., a water-based pen, wine, coffee, etc.), oil-soluble (e.g., cosmetics, an oil-based pen, paint, etc.), a protein contaminant (e.g., blood, chocolate, etc.), and a solid contaminant (e.g., fine dust, soil, cement, etc.).

Also, the processor 440 may identify the characteristics of the fiber threads (e.g., whether the threads are cut, whether the strands are undone, the degree of decoloring, etc.) based on the enlarged image, and may also identify the degree of damage, the degree of fastness, etc. of the clothes 10.

In the aforementioned example, it was explained that the processor 440 identifies the material of the clothes 10, the type of the contaminant, the characteristics of the threads, etc. of the clothes 10 based on an enlarged image, but the disclosure is obviously not limited thereto. As illustrated in FIG. 13, the processor 440 may input the information on the fiber acquired from the enlarged image, and the spectroscopic spectrum information acquired from the electromagnetic wave sensor 420 into the neural network model 1, and the neural network model 1 can obviously output the material information, the contamination level information, etc.

As the processor 440 acquires the material information and the contamination level information, the various embodiments of the disclosure explained with reference to the drawings of FIGS. 1 to 11 can obviously be performed by the electronic device 400.

Figure 14:
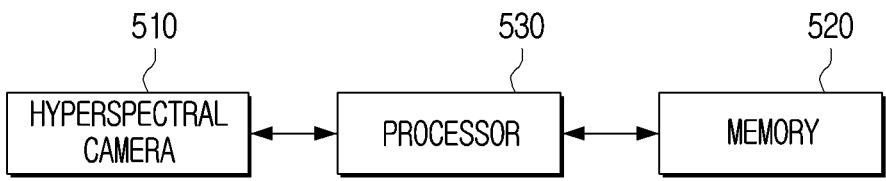
FIG. 14 is a diagram for illustrating an electronic device according to an embodiment of the disclosure.

FIG. 14 is a diagram for illustrating an electronic device according to an embodiment of the disclosure.

Referring to FIG. 14, the electronic device 500 according to still another embodiment of the disclosure includes a hyperspectral camera 510, a memory 520, and a processor 530.

Here, the hyperspectral camera 510 may also be referred to as a hyperspectroscopic camera. The hyperspectral camera 510 outputs a hyperspectral image of an object, and the hyperspectral image may include a spectrum that is identical or similar to what is photographed by a spectrometer per pixel. As an example, the hyperspectral camera 510 photographs the clothes 10 by subdividing the wavelength bands of the visible ray area (400-700 nm) and the near-infrared area (700-1000 nm) into hundreds of sections (bands), and a hyperspectral image acquired through the hyperspectral camera 510 may include the unique radiation wavelength included by the clothes 10 or the contaminant inside the clothes 10.

The processor 530 according to an embodiment may input the hyperspectral image, i.e., the spectroscopic spectrum per pixel into the neural network model 1, and acquire the material information and the contamination level information of the clothes 10.

Detailed explanation in this regard will be described with reference to FIG. 15.

Figure 15:
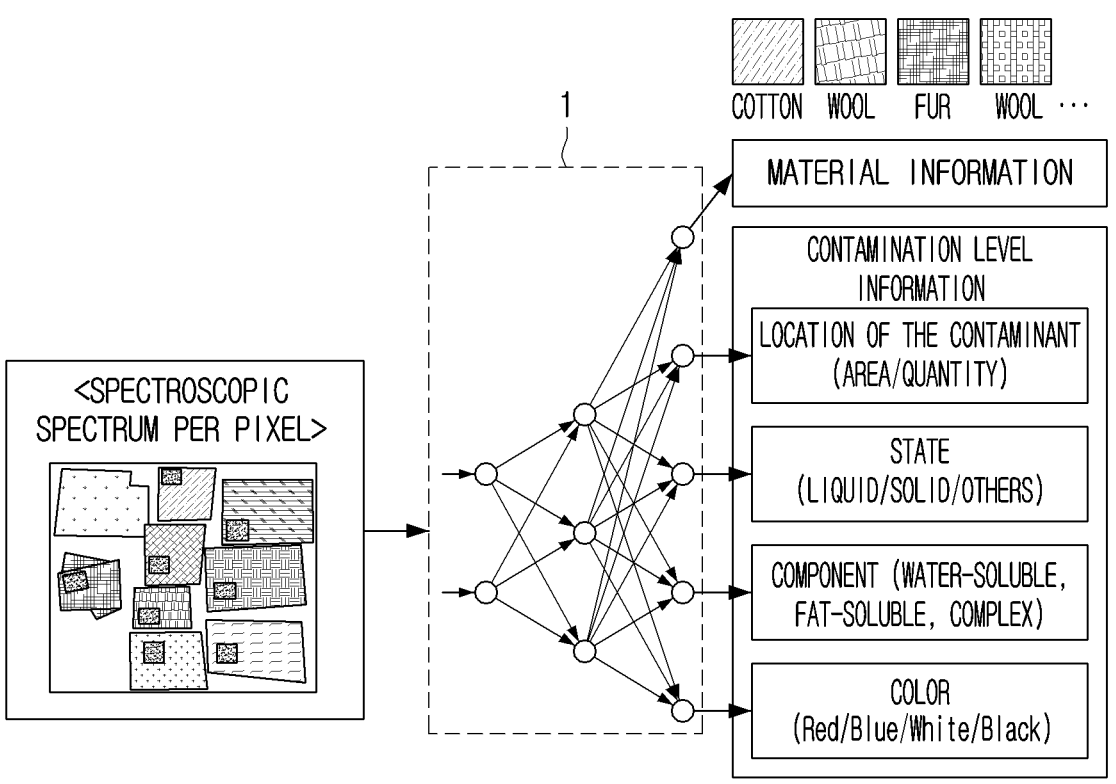
FIG. 15 is a diagram for illustrating a spectroscopic spectrum per pixel according to an embodiment of the disclosure.

FIG. 15 is a diagram for illustrating a spectroscopic spectrum per pixel according to an embodiment of the disclosure.

Referring to FIG. 15, the processor 530 may acquire a spectroscopic spectrum per pixel of an image received from the hyperspectral camera 510 (e.g., a hyperspectral image). Then, the processor 530 may input the spectroscopic spectrum per pixel into the neural network model 1, and acquire the material information and the contamination level information of the clothes 10.

The neural network model 1 according to an embodiment of the disclosure may be a model trained to output material and contamination level information based on various hyperspectral images.

Meanwhile, as the processor 530 acquires the material information and the contamination level information, the various embodiments of the disclosure explained with reference to the drawings of FIGS. 1 to 11 can obviously be performed by the electronic device 500.

A hyperspectral image may be an image that was acquired by photographing only one clothes 10, or it may be an image that was acquired by photographing a plurality of clothes simultaneously. According to an embodiment, if a hyperspectral image is an image that was acquired by photographing a plurality of clothes simultaneously, the processor 530 can obviously acquire the material information and the contamination level information of each of the plurality of clothes.

Figure 16:
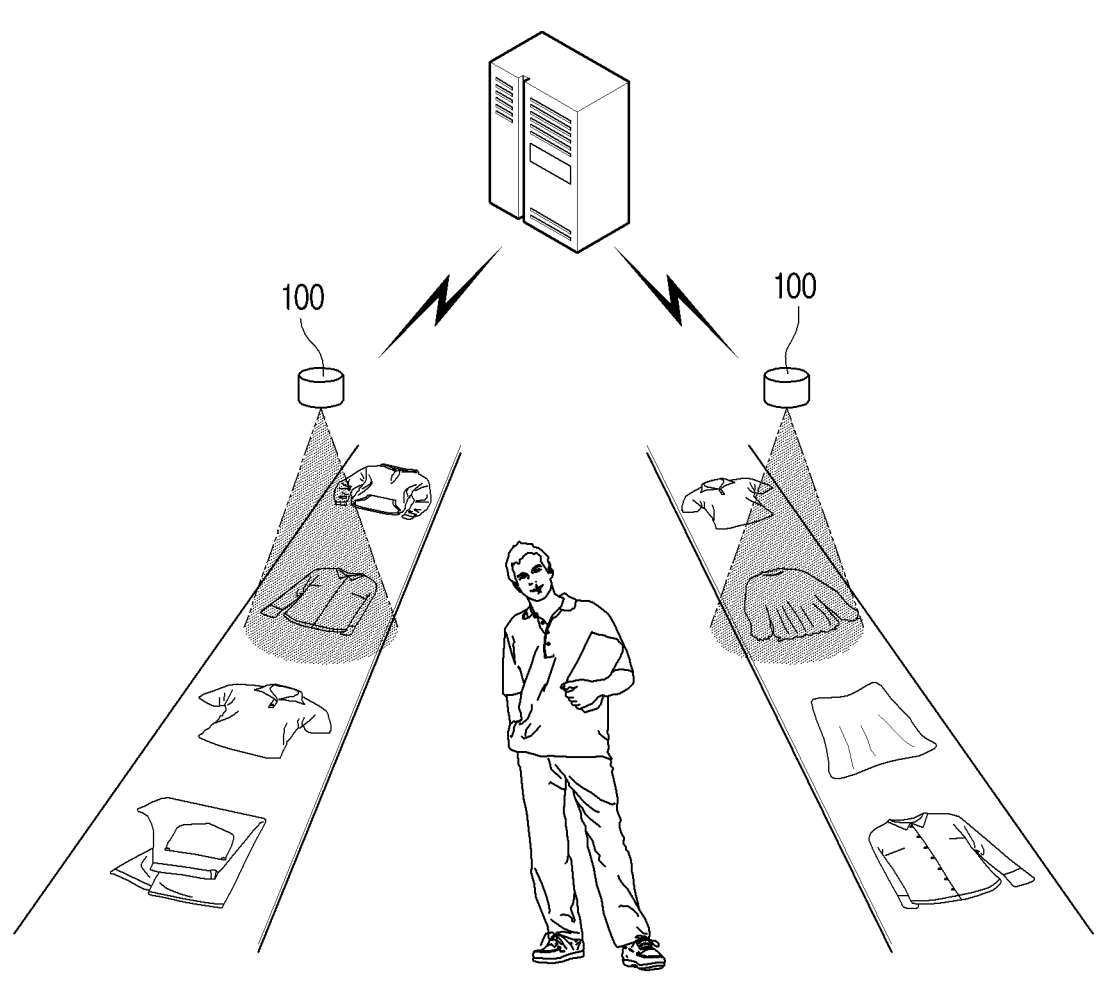
FIG. 16 is a diagram for illustrating a utilization example of an electronic device according to an embodiment of the disclosure.

FIG. 16 is a diagram for illustrating a utilization example of an electronic device according to an embodiment of the disclosure.

Referring to FIG. 16, the electronic device 100 may be utilized not only in a home, but can also be utilized in a clothes management business such as a laundromat, a clothes manufacturing factory, etc.

For example, the electronic device 100 can obviously be included in the lower part of a drone, an end part of a polyarticular robot, or the upper part of a conveyor belt in a factory, and acquire material information and contamination level information of each of a plurality of clothes.

As an example, the electronic device 100 may sequentially emit ultrasonic waves and electromagnetic waves to a plurality of clothes moving on a conveyor belt, and acquire the material information and the contamination level information of each of the plurality of clothes based on the received ultrasonic waves and electromagnetic waves.

According to an embodiment, an external device or a manger in a factory may classify a plurality of clothes based on at least one of the material information or the contamination level information.

As an example, an external device may classify a plurality of clothes by the same materials based on the material information of each of the plurality of clothes received from the electronic device 100, or classify the plurality of clothes by the same or similar types of contaminants based on the contamination level information. For example, the external device may classify the plurality of clothes into clothes contaminated by a water-soluble contaminant, clothes contaminated by a fat-soluble contaminant, and clothes contaminated by a protein contaminant.

Here, the external device and the electronic device 100 may be implemented as different devices, or they can obviously be implemented as one device.

Figure 17:
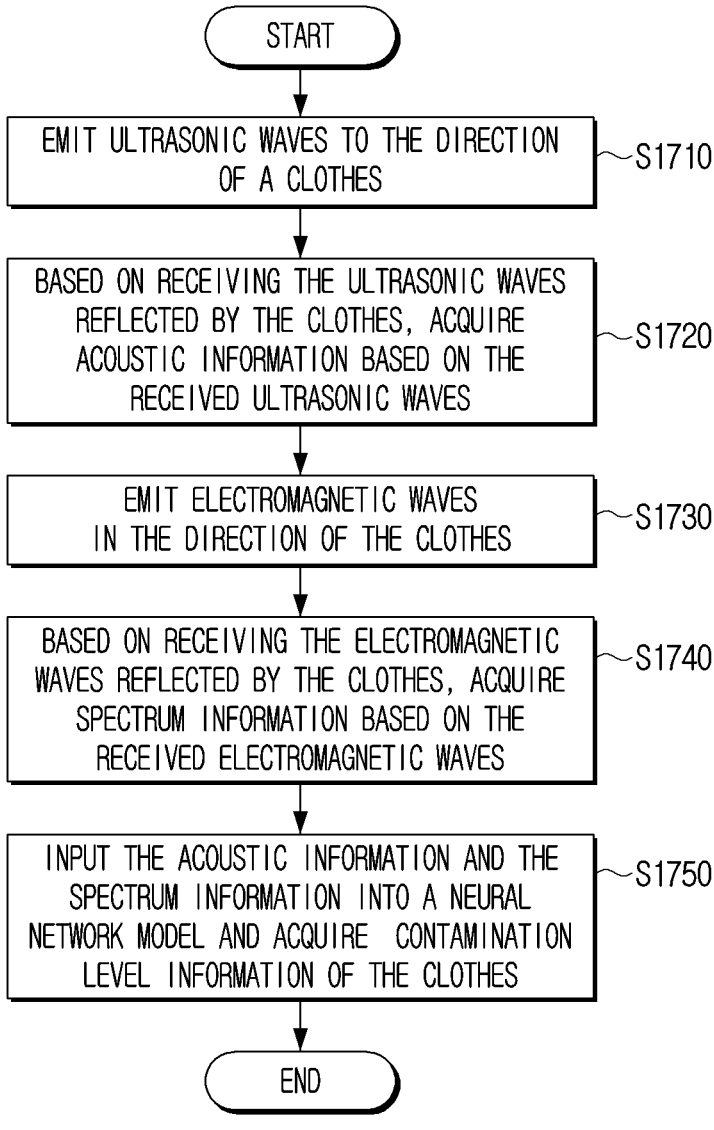
FIG. 17 is a flow chart for illustrating a control method for an electronic device according to an embodiment of the disclosure.

FIG. 17 is a flow chart for illustrating a control method for an electronic device according to an embodiment of the disclosure.

According to a control method for an electronic device according to an embodiment of the disclosure, first, ultrasonic waves are emitted in the direction of a clothes in operation S1710. Then, when the ultrasonic waves reflected by the clothes are received, acoustic information is acquired based on the received ultrasonic waves in operation S1720.

Then, electromagnetic waves are emitted in the direction of the clothes in operation S1730. When the electromagnetic waves reflected by the clothes are received, spectrum information is acquired based on the received electromagnetic waves in operation S1740.

Then, the acoustic information and the spectrum information are input into a neural network model, and contamination level information of the clothes is acquired in operation S1750.

Here, the contamination level information of the clothes may include at least one of the location of a contaminant, the state of the contaminant, the component of the contaminant, or the area of the contaminant, and the color of the contaminant. Also, the state of the contaminant may include at least one of a solid state or a liquid state, and the component of the contaminant may include at least one of a water-soluble component, a fat-soluble component, or a complex component.

The control method according to an embodiment may further include the step of acquiring cleaner information for removing a contaminant based on the contamination level information of the clothes, and the cleaner information may include a mixed ratio of each of a fat-soluble cleaner, a water-soluble cleaner, and a complex cleaner.

The control method according to an embodiment of the disclosure may further include the steps of transmitting the contamination level information of the clothes to an external server, and based on receiving information on a method for removing a contaminant corresponding to the contamination level information from the external server, providing the received information.

The control method according to an embodiment of the disclosure may further include the step of inputting the acoustic information and the spectrum information into the neural network model and acquiring material information of the clothes, and the material information may include at least one of cotton, wool, fur, nylon, polyester, leather, or denim.

Here, the control method may further include the step of acquiring cleaner information corresponding to the material of the clothes based on the contamination level information and the material information, and the cleaner information may include a mixed ratio of each of a fat-soluble cleaner, a water-soluble cleaner, and a complex cleaner.

Here, the control method may further include the step of transmitting at least one of the contamination level information, the material information, or the cleaner information to an external device, and the external device may include at least one of a clothes management device, a washing machine, a dryer, or an electric iron.

Also, an electronic device according to an embodiment may store clothes management information corresponding to each of a plurality of materials, and the control method may further include the steps of acquiring clothes management information corresponding to the material of the clothes among the plurality of clothes management information, and providing the acquired clothes management information.

Meanwhile, the various embodiments of the disclosure may not only be applied to an electronic device, but can obviously be applied to all electronic devices that include a sensor and can acquire sensing values.

Meanwhile, the various embodiments described above may be implemented in a recording medium that can be read by a computer or a device similar to a computer, by using software, hardware, or a combination thereof. In some cases, the embodiments described in this specification may be implemented as a processor itself. According to implementation by software, the embodiments such as procedures and functions described in this specification may be implemented as separate software modules. Each of the software modules can perform one or more functions and operations described in this specification.

Meanwhile, computer instructions for performing processing operations of an electronic device according to the aforementioned various embodiments of the disclosure may be stored in a non-transitory computer-readable medium. Computer instructions stored in such a non-transitory computer-readable medium may make the processing operations at the electronic device according to the aforementioned various embodiments performed by a specific machine, when the instructions are executed by the processor of the specific machine.

A non-transitory computer-readable medium refers to a medium that stores data semi-permanently, and is readable by machines, but not a medium that stores data for a short moment such as a register, a cache, and a memory. As specific examples of a non-transitory computer-readable medium, there may be a compact disc (CD), a DVD, a hard disc, a blue-ray disc, a USB, a memory card, a ROM, and the like.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
an ultrasonic sensor;
an electromagnetic wave sensor;
a tactile sensor;
a memory storing at least one instruction; and
a processor electronically connected to the memory,
wherein the processor is configured to:
    control the ultrasonic sensor to emit ultrasonic waves in a direction of clothing,
    based on the ultrasonic waves reflected by the clothing being received through the ultrasonic sensor, acquire acoustic information based on the received ultrasonic waves,
    control the electromagnetic wave sensor to emit electromagnetic waves in the direction of the clothing,
    based on the electromagnetic waves reflected by the clothing being received through the electromagnetic wave sensor, acquire spectrum information based on the received electromagnetic waves, and
    input a friction coefficient acquired through the tactile sensor, the acoustic information and the spectrum information into a neural network model and acquire contamination level information of the clothing.

2. The electronic device of claim 1,
wherein the contamination level information of the clothing comprises:
    at least one of a location of a contaminant, a state of the contaminant, a component of the contaminant, an area of the contaminant, and a color of the contaminant,
wherein the state of the contaminant comprises:
    at least one of a solid state or a liquid state, and
wherein the component of the contaminant comprises:
    at least one of a water-soluble component, a fat-soluble component, or a complex component.

3. The electronic device of claim 1,
wherein the processor is further configured to:
    acquire cleaner information for removing a contaminant based on the contamination level information of the clothing, and
wherein the cleaner information comprises:
    a mixed ratio of each of a fat-soluble cleaner,
    a water-soluble cleaner, and
    a complex cleaner.

4. The electronic device of claim 1, further comprising:
a communicator; and
a display,
wherein the processor is further configured to:
    transmit the contamination level information of the clothing to an external server through the communicator, and
    based on receiving information on a method for removing a contaminant corresponding to the contamination level information from the external server, control the display to provide the received information.

5. The electronic device of claim 1,
wherein the processor is further configured to:
    input the acoustic information and the spectrum information into the neural network model, and
    acquire material information of the clothing, and
wherein the material information comprises:
    at least one of cotton, wool, fur, nylon, polyester, leather, or denim.

6. The electronic device of claim 5,
wherein the processor is further configured to:
    acquire cleaner information corresponding to the material of the clothing based on the contamination level information and the material information, and
wherein the cleaner information comprises:
    a mixed ratio of each of a fat-soluble cleaner,
    a water-soluble cleaner, and
    a complex cleaner.

7. The electronic device of claim 6, further comprising:
a communicator,
wherein the processor is further configured to:
    control the communicator to transmit at least one of the contamination level information, the material information, or the cleaner information to an external device, and
wherein the external device comprises:
    at least one of a clothes management device, a washing machine, a dryer, or an electric iron.

8. The electronic device of claim 5, further comprising:
a display,
wherein the memory is configured to store clothes management information corresponding to each of a plurality of materials, and
wherein the processor is further configured to:
    acquire clothes management information corresponding to the material of the clothing among the clothes management information, and
    provide the acquired clothes management information through the display.

9. A control method for an electronic device, the control method comprising:
    emitting ultrasonic waves in a direction of clothing;
    based on the ultrasonic waves reflected by the clothing being received, acquiring acoustic information based on the received ultrasonic waves;
    emitting electromagnetic waves in the direction of the clothing;
    based on the electromagnetic waves reflected by the clothing being received, acquiring spectrum information based on the received electromagnetic waves;
    inputting a friction coefficient acquired through a tactile sensor, the acoustic information and the spectrum information into a neural network model; and
    acquiring contamination level information of the clothing.

10. The control method of claim 9,
wherein the contamination level information of the clothes comprises:
    at least one of a location of a contaminant, a state of the contaminant, a component of the contaminant, an area of the contaminant, and a color of the contaminant,
wherein the state of the contaminant comprises:
    at least one of a solid state or a liquid state, and
wherein the component of the contaminant comprises:
    at least one of a water-soluble component, a fat-soluble component, or a complex component.

11. The control method of claim 9, further comprising:

acquiring cleaner information for removing a contaminant based on the contamination level information of the clothes, wherein the cleaner information comprises:

a mixed ratio of each of a fat-soluble cleaner, a water-soluble cleaner, and a complex cleaner.

12. The control method of claim 9, further comprising:

transmitting the contamination level information of the clothes to an external server; and based on receiving information on a method for removing a contaminant corresponding to the contamination level information from the external server, providing the received information.

13. The control method of claim 9, further comprising:

inputting the acoustic information and the spectrum information into the neural network model; and acquiring material information of the clothes, wherein the material information comprises:

at least one of cotton, wool, fur, nylon, polyester, leather, or denim.

14. The control method of claim 13, further comprising:

acquiring cleaner information corresponding to the material of the clothes based on the contamination level information and the material information, wherein the cleaner information comprises:

a mixed ratio of each of a fat-soluble cleaner, a water-soluble cleaner, and a complex cleaner.

15. The control method of claim 14, further comprising:

transmitting at least one of the contamination level information, the material information, or the cleaner information to an external device, wherein the external device comprises:

at least one of a clothes management device, a washing machine, a dryer, or an electric iron.

16. The control method of claim 13, wherein the electronic device comprises clothes management information corresponding to each of a plurality of materials, and wherein the method further comprises:

acquiring clothes management information corresponding to the material of the clothing among the clothes management information, and providing the acquired clothes management information through a display of the electronic device.

17. A computer readable recording medium including a program for executing a method of controlling an electronic device, the method comprising:

emitting ultrasonic waves in a direction of clothing;

based on the ultrasonic waves reflected by the clothing being received, acquiring acoustic information based on the received ultrasonic waves;

emitting electromagnetic waves in the direction of the clothing;

based on the electromagnetic waves reflected by the clothing being received, acquiring spectrum information based on the received electromagnetic waves;

inputting a friction coefficient acquired through a tactile sensor, the acoustic information and the spectrum information into a neural network model; and acquiring contamination level information of the clothing.

* * * * *